(12) United States Patent
Degani et al.

(10) Patent No.: US 11,650,288 B2
(45) Date of Patent: May 16, 2023

(54) METHODS OF DETECTING TARGETS WITH ENVIRONMENT-ADAPTIVE CALIBRATION

(71) Applicant: Inxpect S.p.A., Brescia (IT)

(72) Inventors: Alessio Degani, Brescia (IT); Marco Garatti, Brescia (IT); Andrea Tartaro, Brescia (IT)

(73) Assignee: INXPECT S.p.A., Brescia (IT)

( * ) Notice: Subject to any disclaimer, the term of this patent is extended or adjusted under 35 U.S.C. 154(b) by 364 days.

(21) Appl. No.: 16/828,544

(22) Filed: Mar. 24, 2020

(65) Prior Publication Data

US 2020/0309903 A1 Oct. 1, 2020

(30) Foreign Application Priority Data

Mar. 25, 2019 (IT) .......................... 102019000004243

(51) Int. Cl.
*G01S 7/40* (2006.01)
*G01S 13/34* (2006.01)

(52) U.S. Cl.
CPC .......... *G01S 7/4004* (2013.01); *G01S 13/34* (2013.01)

(58) Field of Classification Search
CPC . G01S 7/414; G01S 7/41; G01S 7/412; G01S 7/411; G01S 7/40; G01S 7/497; G01S 7/4004; G01S 13/931; G01S 7/4026; G01S 7/415; G01S 13/08; G01S 13/34; G01S 13/42; G01S 7/4021; G01S 7/4082; G01S 13/0209
See application file for complete search history.

(56) References Cited

U.S. PATENT DOCUMENTS 9,285,469 B1 * 3/2016 Schuman ................ G01S 7/003
2005/0093736 A1 * 5/2005 Fukute .................... G01S 7/411
342/107

(Continued)

FOREIGN PATENT DOCUMENTS

WO 2016120051 A1 8/2016

OTHER PUBLICATIONS

Italian Search Report and Written Opinion dated Dec. 10, 2019, in IT Application No. 102019000004243, 9 pages.

*Primary Examiner* — Olumide Ajibade Akonai
(74) *Attorney, Agent, or Firm* — MH2 Technology Law Group LLP

(57) ABSTRACT

A method of estimating a radar cross section of a target in an environment using a detection device, wherein the detection device is configured to transmit transmission signals into a field of view and to receive reception signals, may include: generating a calibration curve that provides signal amplitude values as a function of positions in the field of view; detecting a reception signal, obtaining a corresponding detection profile, and analyzing the detection profile to identify the target, having a target signal amplitude and a target position corresponding thereto; and estimating the radar cross section of the target by comparing the target signal amplitude with a signal amplitude base value, provided by the calibration curve at the target position. The generating of the calibration curve may include: generating a combined profile as a function of position; and optionally, generating a filtered profile by applying a filter to the combined profile.

18 Claims, 3 Drawing Sheets

(56) References Cited

U.S. PATENT DOCUMENTS

| | | | |
|---|---|---|---|
| 2009/0195365 A1* | 8/2009 | Peczalski | H04Q 9/00 |
| | | | 340/10.5 |
| 2011/0181458 A1 | 7/2011 | Feil | |
| 2015/0070207 A1* | 3/2015 | Millar | G01S 13/4454 |
| | | | 342/174 |
| 2019/0385746 A1* | 12/2019 | Wood | G16H 50/30 |

* cited by examiner

METHODS OF DETECTING TARGETS WITH ENVIRONMENT-ADAPTIVE CALIBRATION

CROSS-REFERENCE TO RELATED APPLICATION(S)

This application claims priority under 35 U.S.C. § 119 from Italian Patent Application No. 102019000004243, filed on Mar. 25, 2019, in the Italian Patent and Trademark Office ("IPTO"), the entire contents of which are incorporated herein by reference.

FIELD OF THE INVENTION

The present invention relates to the detection of objects in an environment to be monitored, e.g. using radar technologies. More in detail, the invention relates to a detection method that includes calibration steps for a detection device.

BACKGROUND ART

Systems for detecting objects in an environment, such as radar systems, can transmit an electromagnetic signal into an environment to be monitored and receive a signal reflected from the objects to identify their position in the environment.

These systems can be used for safety, both in intrusion alarms and for personnel safety in factories in which moving too close to certain machinery having moving parts is dangerous. A critical requirement in these applications is the ability of the device to properly distinguish the different targets. In intrusion alarm systems used by private entities the device must distinguish the movements of humans from those of pets, birds or other animals, to avoid false alarms. In industrial applications the device should signal human movements to set machinery in safe mode when operators enter the protected area, i.e. the area near machinery having moving parts.

Target distinction is based on the Radar Cross Section (RCS).

RCS is a physical property of the target that varies according to the shape, material and the size of the target and is thus an object-specific property. RCS is indirectly obtained from the power received (backscattered) from the target toward the receiver. Nevertheless, the backscattered power depends on various factors including the amplitude of the electromagnetic signal, the distance of the target from the detection device and the mounting conditions of the device. Since RCS can be only indirectly estimated, as long as the distance from the receiver and the power of the target are known, power should be made independent of target position by calibration.

Problem of the Prior Art

In certain prior art detection systems, the detection device is calibrated using installation curves of the radar that are standard and do not adapt to the environment and to mounting setup. Nevertheless, the applicant found that such calibration is inaccurate and causes a great number of false alarms.

Prior art document WO 2016120051 discloses a method of detecting the tilt in the vertical direction of a radar mounted to a vehicle. The method includes collecting amplitude data of a single target which is detected in different positions as the vehicle and/or the target move. Such amplitudes are plotted as a function of to the horizontal angle at which the radar sees the target. Furthermore, inherent amplitude variations caused by the varying distance of the target and by the antenna gain according to the horizontal angles are compensated for. The final form of the chart is used to detect tilts in the vertical direction. Therefore, WO 2016120051 suggests steps to compensate for the different amplitudes with which a target is detected in different positions, in a broader tilt detection method. Like in the above discussed prior art examples, this compensation is only carried out using preset curves (such as the monostatic radar equation) that do not account for the distortions caused by the use of a fixed environment.

SUMMARY OF THE INVENTION

The object of the present invention is to obviate the aforementioned prior art problems, and particularly to provide a detection method in which a detection device is calibrated to discriminate targets while accounting for the environment and the mounting setup.

This and other objects are fulfilled by a method of detecting objects in an environment as defined in any of the accompanying claims. In particular, the device performs its calibration by transmitting and receiving the electromagnetic signal of a calibration target that is being moved in the field of view. For calibration the reflected signals are combined to generate a combined profile. The combined profile, after optional filtering or further processing affecting only marginally its whole shape, is used as a correction curve, or calibration curve, to be applied to detections after calibration. Thus, the method allows the signal amplitude of targets to be calibrated while accounting for the environment and the mounting setup.

In the preferred embodiment, the reflected signals are not only combined but also filtered and compared with a reference signal amplitude function depending on the distance from the device and the mounting setup of the device. This comparison allows a correction factor to be calculated, which minimizes the error between the combination of the signals and the reference function. This reference function is multiplied by the correction factor and by a coefficient of less than 1 to generate a curve for eliminating minimum values. The calibration curve is obtained from this curve, by eliminating the minimum values from the combined profile.

BRIEF DESCRIPTION OF THE DRAWINGS

The present invention will be described with the help of the attached figures, representing steps that are taken according to a preferred embodiment of the invention, wherein.

DETAILED DESCRIPTION

Figure 1:
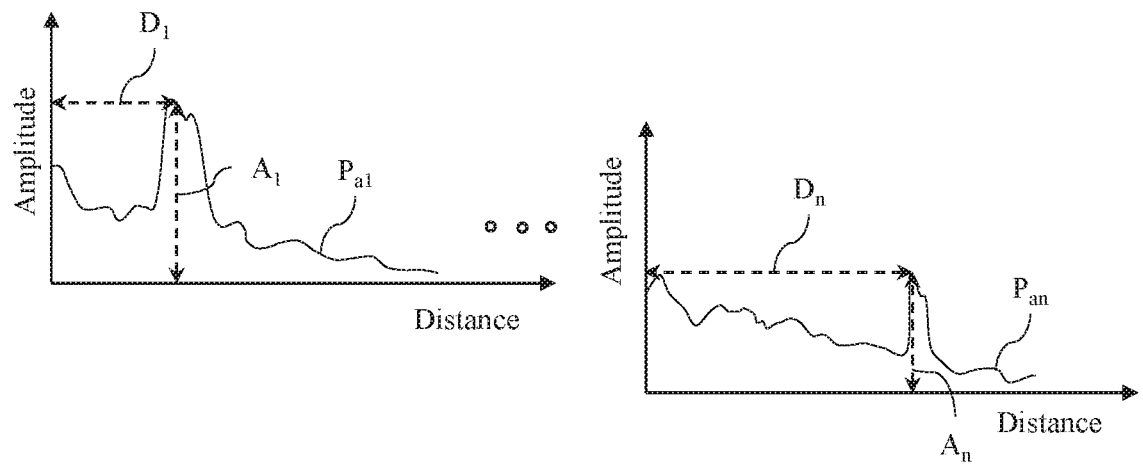
FIG. 1 schematically shows a temporal succession of detection profiles corresponding to a succession of signals reflected by a calibration target.

The present invention discloses a detection method that includes calibration steps for a target detection device in an environment to be monitored. The detection system is preferably a radar system.

Both during calibration, as described below, and later during normal operation of the device, the detection device transmits electromagnetic signals via an antenna. Later, the signals reflected from the environment and received by the device are mixed with the signals that have been transmitted and processed to obtain a baseband signal. The baseband signal has a frequency that is equal to the difference between the frequencies of the transmitted signals and the received signals.

After each transmission cycle, the baseband signal is processed to generate a detection profile with well-known methods, e.g. comprising a Fourier transform. The detection profile is analyzed to check whether the target to be identified is in the environment or not. Such check is made by identifying amplitude peaks above a distinctive threshold. A target signal amplitude and a target position are determined for each target, in a well-known manner.

Once the device has been installed in the desired environment, the device must be calibrated for the target to be able to be distinguished irrespective of the distance of the target in the environment from the device. The initial calibration particularly provides a calibration curve that will be later used to estimate the Radar Cross Section of the target. This is because, as discussed above, the same target may originate reflected signals of different amplitudes depending on its position in the environment, while still having the same RCS.

In one aspect of the invention, calibration requires a calibration target to be moved in the field of view of the detection device and a succession of signals reflected from the moving target to be acquired. The target must move along the field of view of the device from a location selected as the origin in the environment. The target moves along a predetermined path, e.g. along the normal to the device.

The calibration target may be a man, a machine or any target to be discriminated. For example, depending of the installation environment, discrimination may be desired between a human target and an animal target for safety of an environment, or between a human and a machine in industrial applications and so on. In the preferred embodiment, the target moves by walking.

The device is capable of measuring the distance of the target from the device using known techniques and may be optionally capable of measure the angle within the field of view of the target, known as azimuth angle. In this case, calibration may be carried out while also accounting for the angle with the normal for each distance from the receiver. Therefore, calibration results in the generation of a calibration curve with value that generally differ according to the position of the target, in terms of both distance and azimuth angle. The calibration will be initially described with reference to distance correction only, and more in detail below with corrections that also contemplate the azimuthal angle.

Once the reflected signals have been acquired, the signals that represent the calibration target movements are processed and combined with one another to generate a combined profile. Generating the combined profile comprises obtaining, for each distance of the predetermined path, an amplitude value derived from a corresponding reception signal of the succession, for which the target is detected to be at said distance.

In one embodiment, the calibration curve is equal to the combined profile. Nevertheless, as more clearly explained below, the construction of the calibration curve may comprise additional successive substeps, whereby the calibration curve remains equal to the combined profile only for a few sets of positions, or the calibration curve is equal to values that are modified from those of the combined profile.

Figure 2:
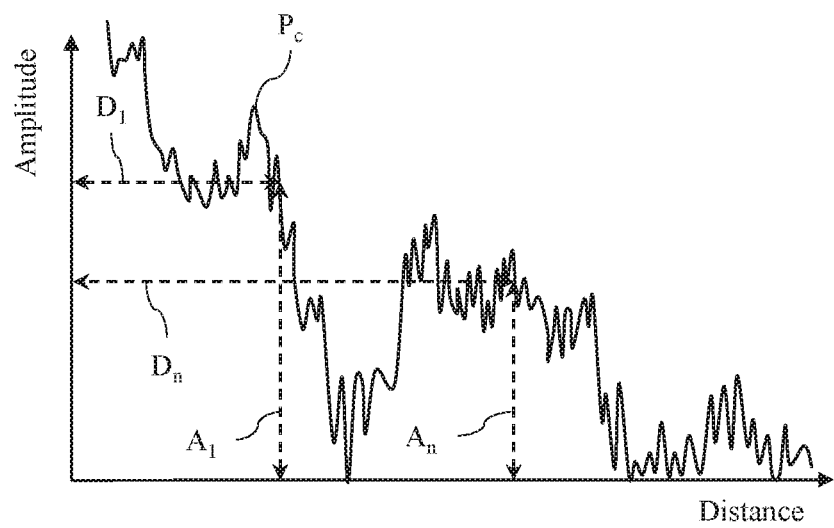
FIG. 2 shows a combined profile obtained by combining amplitudes and positions derived from the succession of reflected signals.

More in detail, the construction of the combined profile, with reference to FIG. 1, involves the generation of a sequence of amplitude profiles dependent on the position $P_{a1}, \ldots, P_{an}$, which sequence corresponds to the sequence of reflected signals of the sequence. The amplitude values of the combined profile are each extracted from a corresponding amplitude profile of the sequence, while keeping their relation with the position (for example the amplitude values $A_1, \ldots, A_n$ correlated to the distances $D_1, \ldots, D_n$). The derived combined profile $P_c$ is shown in FIG. 2.

Figure 3:
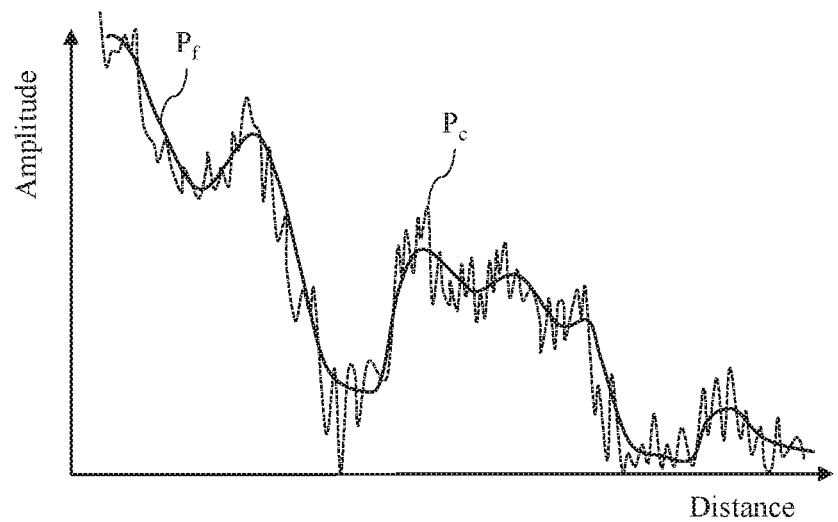
FIG. 3 shows the filtering of the combined profile to obtain a filtered profile.

Preferably, in order to generate the calibration curve, the amplitude values of the combined profile are filtered, to thereby obtain a filtered profile $P_f$ which is visible in FIG. 3 together with the superimposed dashed combined profile $P_c$ (high-frequency components of the combined profile have been exaggerated to better highlight filtering in the figures). In one embodiment, the calibration curve is equal to the filtered profile, and not to the combined profile. In general, in the preferred embodiments the calibration curve is equal to a chosen profile that is selected between the combined profile $P_c$ and the filtered profile $P_f$, for all the positions in the environment, or at least for a subset of first positions thereof, as discussed below.

In more detail about the filtering, the filter applied to the combined profile is a digital low-pass filter. The filter operates on distributions of values, namely signal amplitudes, as a function of positions in the field of view. For example, the filter may output, for each position, an average of the values of the input profile given for that position and for a set of positions surrounding it. This example of moving average, which is applied according to the position and not according to a time sequence, will allow the skilled person to also implement other equivalent digital filters (such as finite impulse response (FIR) and infinite impulse response (IIR)) in obvious ways.

The aforementioned low-pass filter is thus configured to damp the position-dependent variations of the values of the combined profile $P_c$, while preserving the general pattern of the combined profile $P_c$. In other words, the filter damps the high-frequency components of the combined profile $P_c$ i.e., the noise of the combined profile $P_c$) without damping its low-frequency components. Such components and their frequencies are to be understood in terms of distribution of values as a function of the position. The filter has its own cutoff frequency between the frequencies of the low-frequency components, which are not significantly damped, and the frequencies of the high-frequency components.

In certain embodiments, generating the calibration curve comprises increasing at least some of the amplitude values of the chosen profile. In detail, it shall be noted that the chosen profile has values ranging from a minimum value to a maximum value. The amplitude values that are increased are generally amplitude values proximate to the minimum value.

The preferred increasing method is based on a curve for eliminating the minimum values $C_e$ as a function of distance, or position. Thus, the chosen profile is compared with the minimum value eliminating curve. Hence, the set of positions in the environment is divided into first positions $P_1$ (FIG. 6), where the chosen profile is greater than the minimum value eliminating curve, and second positions $P_2$ where the chosen profile is smaller than the minimum value eliminating curve. The (generally rare) positions in which the chosen profile is exactly equal to the minimum value eliminating curve may be indifferently regarded as first or second positions.

Therefore, the minimum value eliminating curve provides a rule to determine the positions in which the chosen profile must be increased, i.e. the second positions, where the calibration curve will be greater than the chosen profile, and the positions in which the calibration curve will remain equal to the chosen profile, i.e. the first positions. In the preferred embodiment, the values of the calibration curve are calculated for each position as a maximum of the chosen profile and the minimum value eliminating curve.

Since these profiles and curves have a minor variability between adjacent positions in real environments, the sets of the first positions and of the second positions will not easily contain individual isolated positions, or in any case such positions will be in a small number. Conversely, one or more first pluralities of positions will be found in the first positions, and one or more second pluralities of positions will be found in the second positions, each of such pluralities being composed of adjacent positions.

More in detail, at least one first plurality of positions completely covers at least a continuous length of said predetermined path, for example a range of distances. Preferably, the first positions cover at least 50% of the positions of the field of view. On the other hand, the second positions will include those in which the calibration target has not been carried, or anyway in which it has not been detected, in addition to positions in which for some reason it is detected with a very low intensity, not justified for example by the distance.

In the preferred embodiment, in order to generate the minimum value eliminating curve, a reference function, or a family of reference functions, may be first provided giving signal amplitude as a function of the distance and optionally of the azimuthal angle of the target relative to the detection device.

Figure 4:
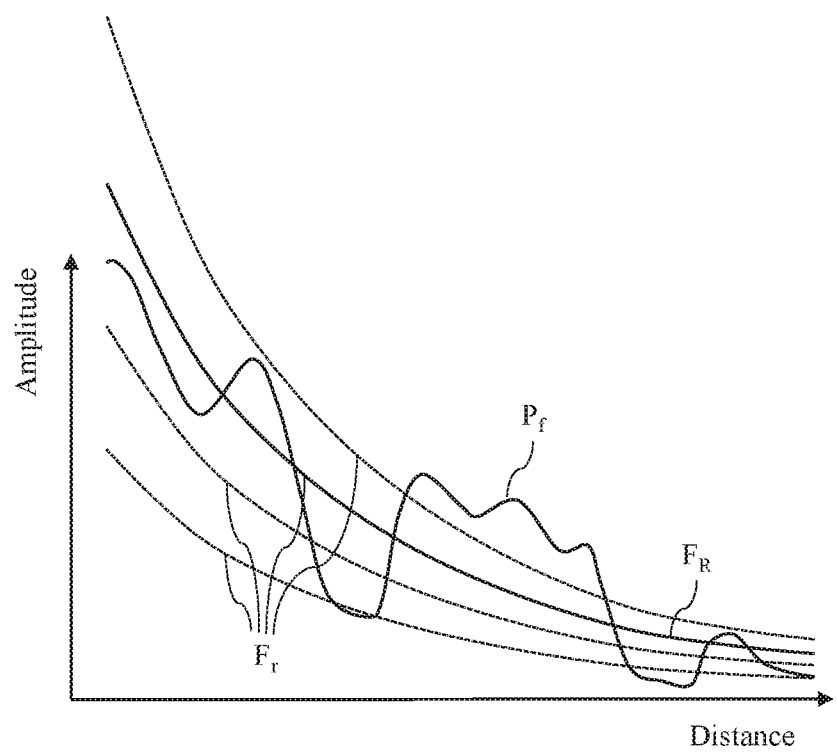
FIG. 4 shows the identification, among a family of reference functions, of the one best fitting the filtered profile.

The minimum value eliminating curve will be obtained using the reference function and a correction factor. In the preferred embodiment, the reference function is multiplied by the correction factor. As the correction factor varies, a family of reference functions $F_r$ is then obtained in each case (as shown in FIG. 4 with different functions for different correction factors).

In particular, the reference function for signal amplitude is represented by an ideal signal attenuation varying as a function of the distance of the target from the device. This attenuation is calculated using the monostatic radar equation, which establishes that the power of the received signal is proportional to the RCS of the target and is inversely proportional to the distance of the target from the device to the fourth power.

In addition, the reference function also accounts for the information about the positioning setup of the detection device, relating to the way the device is installed in the environment in which it is placed. Preferably, the setup information relates to the height and tilt of the device relative to the floor of the environment.

In order to obtain a minimum value eliminating curve that is as close as possible to the chosen profile, the chosen profile is compared with the reference function to generate the correction factor. In particular, the comparison includes minimizing the mean-square error (least square) between the chosen profile and the product of the reference function and the correction factor. Once the mean-square error has been minimized, the correction factor can be multiplied by a coefficient of less than one. In the preferred embodiment, the coefficient ranges from 0.5 to 0.9, and is more preferably about 0.8.

Figure 5:
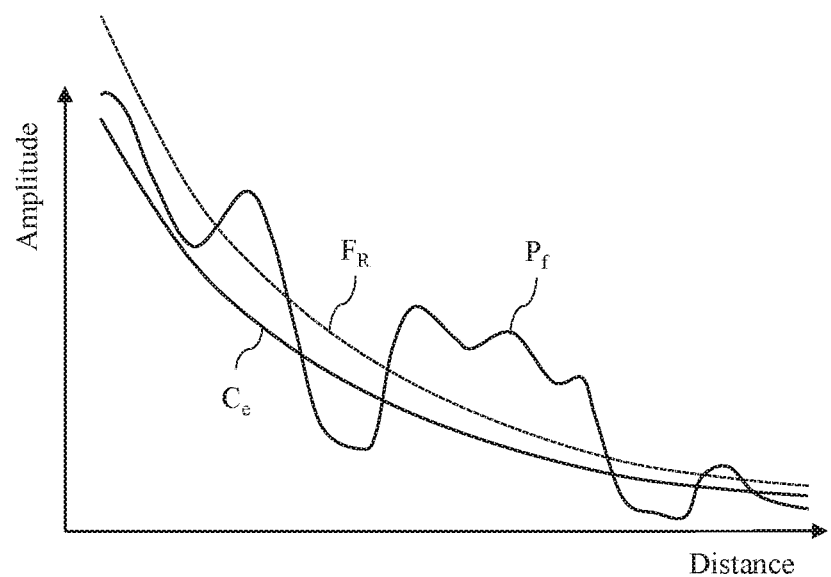
FIG. 5 shows rescaling of the selected reference function for obtaining a curve for eliminating the minimum values.

This corresponds to selecting the curve that best fits the chosen profile from the family of reference functions $F_r$ (the selected curve being indicated as $F_R$ and represented with a continuous line in FIG. 4), and preferably multiplying it by the coefficient of less than one, to thereby obtain the minimum value eliminating curve $C_e$ shown in FIG. 5 (where, instead, the function selected previously based on the least square method is dashed).

In a simplified embodiment, the eliminating curve is instead obtained irrespective of any comparison with the chosen profile, e.g., by selecting a monostatic radar equation with an arbitrary amplitude and avoiding any fitting.

Figure 6:
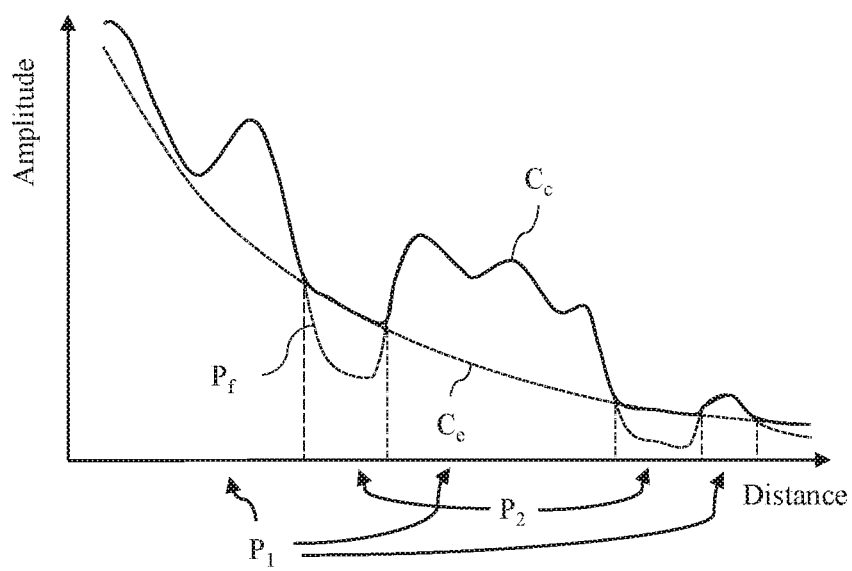
FIG. 6 shows obtaining the final calibration curve, as a maximum of the filtered profile and the curve for eliminating the minimum values.

Finally, as mentioned above, the calibration curve $C_c$ may be calculated as the maximum of the extracted amplitude values, optionally filtered (i.e., the chosen profile), and the minimum value eliminating curve, as shown in FIG. 6.

In short, in the preferred embodiment, the low values of the chosen profile are eliminated, or increased, because the calibration curve can never be smaller than the minimum value eliminating curve. The minimum value eliminating curve is calculated by multiplying the reference function by the correction factor obtained by minimizing the error and optionally by multiplying it by the coefficient of less than one.

The elimination of minimum values is implemented because errors during acquisition of the sequence of reflected signals might cause the chosen profile to assume substantially zero values as the target was not detected.

On the other hand, if the minimum values were eliminated without applying the coefficient of less than one, the form of the chosen profile would be significantly altered, as it would lose relatively low values that are still correctly representative of signal attenuation. Therefore, the coefficient of less than one allows the calibration curve to remain as a whole more similar to the chosen profile.

In one aspect of the method of detecting a target in the environment, each detection after calibration includes estimating the radar cross section of each detected target by comparing the target signal amplitude with a signal amplitude base value, provided by the calibration curve at the target position. This may be accomplished, for example, by calculating at least one comparison value selected from a difference value, obtained by subtracting the base value from the target signal amplitude, and a ratio value, obtained by dividing the target signal amplitude by the base value.

Preferably, the entire calibration curve is applied to the current detection profile to generate an output profile which includes the comparison value. For example, the detection profile is divided by the calibration curve.

In both cases, a target category may be associated with the comparison value, based on a predetermined correspondence. For example, if the calibration target was a human target and another human target of similar size is later detected (in a position of the first plurality of positions), the comparison value given by the ratio value is close to 1. For comparison values, for example, of less than 0.6 the target may be deemed to be not human, and possibly an animal target.

Advantageously, the calculation described for the calibration curve accounts for the amount of attenuation of the reflected signal at each distance, as measured for the specific environment in which the device is installed. As a result of the comparison between the current detection profile and the calibration curve, a single target in the output profile generates amplitude peaks that are substantially independent of the distance.

If a calibration curve is desired that also accounts for the azimuthal angle, one of the following exemplary procedures may be followed. In one example, the target moves along a non-straight path in the field of view of the device, preferably such that for each azimuthal angle of a plurality of azimuthal angles in the field of view the target is moved to a plurality of distances. This will provide a combined profile for each azimuthal angle.

Depending on the selected embodiment, this combined profile may be directly used as a calibration curve, or filtering may be provided, as described above, or the values close to the minimum may be increased. In the latter case, the method comprises, at each angle, comparing the chosen profile for that angle with the reference function to generate a correction factor for each angle. Optionally a multiplication by the coefficient of less than one is provided. Also, the steps are provided of generating an eliminating curve for each angle, and calculating it using each time the correction factor of that angle and the reference function, and comparing, for each angle, the combined or filtered profile with the eliminating curve for that angle.

According to another example, the angular correction may be calculated using the radiation pattern of the antenna. Here, the target can only move along the normal of the device. For each distance along the normal, the measured signal will be weighed according to the radiation pattern of the antenna. In other words, the calibration curve, external to the normal, is calculated, for each distance, by multiplying the value, taken by the calibration curve along the normal for that distance, by an attenuation value provided by the antenna pattern.

A skilled person may obviously envisage a number of equivalent changes to the above discussed variants, without departure from the scope defined by the appended claims.

The invention claimed is:

1. A method of estimating a radar cross section of a target in an environment using a detection device, wherein the detection device is configured to transmit transmission signals into a field of view and to receive reception signals, the method comprising:
  generating a calibration curve that provides signal amplitude values as a function of positions in the field of view;
  detecting a reception signal, obtaining a corresponding detection profile, and analyzing the detection profile to identify the target, having a target signal amplitude and a target position corresponding thereto; and
  estimating the radar cross section of the target by comparing the target signal amplitude with a signal amplitude base value, provided by the calibration curve at the target position;
  wherein the generating of the calibration curve comprises:
    positioning and moving a calibration target from a point of origin along a predetermined path in the environment toward or away from the detection device;
    acquiring a succession of reception signals during the positioning and moving of the calibration target; and
    processing and combining together the reception signals of the succession of reception signals to generate a combined profile as a function of position;
    wherein for at least one first plurality of mutually adjacent positions in the field of view, the calibration curve is equal to a chosen profile that is the combined profile, and
    wherein the comparing of the target signal amplitude with the signal amplitude base value comprises calculating at least one comparison value selected from a difference value, obtained by subtracting the signal amplitude base value from the target signal amplitude, and a ratio value, obtained by dividing the target signal amplitude by the signal amplitude base value.

2. The method of claim 1, wherein the generating of the combined profile comprises obtaining, for each position of the predetermined path, an amplitude value derived from a corresponding reception signal of the succession of reception signals, for which the target is detected to be at the position.

3. The method of claim 1, wherein the calibration curve is defined for a set of positions in the field of view, which is composed of first positions, including the at least one first plurality of mutually adjacent positions, and second positions,
  wherein for each of the first positions, the calibration curve is equal to the chosen profile, and
  wherein for each of the second positions, the calibration curve is greater than the chosen profile.

4. The method of claim 3, wherein the generating of the calibration curve further comprises:
  providing a curve for eliminating minimum values; and
  comparing the curve for eliminating the minimum values with the chosen profile, wherein the positions where the chosen profile is greater than the curve for eliminating the minimum values are taken as the first positions, and the positions where the chosen profile is less than the curve for eliminating the minimum values are taken as the second positions.

5. The method of claim 4, wherein values of the calibration curve are calculated for each position as a maximum of the chosen profile and the curve for eliminating the minimum values.

6. The method of claim 4, wherein the providing of the curve for eliminating the minimum values comprises:
  providing a reference function of the signal amplitude values versus the position from the detection device;
  comparing the chosen profile with the reference function to generate a correction factor; and
  calculating the curve for eliminating the minimum values by using the reference function and the correction factor.

7. The method of claim 6, wherein the generating of the correction factor comprises minimizing a mean square error between the chosen profile and a product of the reference function and the correction factor.

8. The method of claim 6, wherein the curve for eliminating the minimum values and/or the reference function is given by a monostatic radar equation.

9. The method of claim 7, wherein the generating of the correction factor further comprises, after minimizing the mean square error, multiplying by a coefficient of less than 1.

10. The method of claim 9, wherein the coefficient is greater than or equal to 0.5 and is less than or equal to 0.9.

11. The method of claim 1, wherein the estimating of the radar cross section of the target comprises associating a target category with the at least one comparison value according to a predetermined correspondence.

12. The method of claim 1, wherein the at least one first plurality of mutually adjacent positions completely covers at least a continuous length of the predetermined path.

13. A method of estimating a radar cross section of a target in an environment using a detection device, wherein the detection device is configured to transmit transmission signals into a field of view and to receive reception signals, the method comprising:
- generating a calibration curve that provides signal amplitude values as a function of positions in the field of view;
- detecting a reception signal, obtaining a corresponding detection profile, and analyzing the detection profile to identify the target, having a target signal amplitude and a target position corresponding thereto; and
- estimating the radar cross section of the target by comparing the target signal amplitude with a signal amplitude base value, provided by the calibration curve at the target position;
- wherein the generating of the calibration curve comprises:
  - positioning and moving a calibration target from a point of origin along a predetermined path in the environment toward or away from the detection device;
  - acquiring a succession of reception signals during the positioning and moving of the calibration target;
  - processing and combining together the reception signals of the succession of reception signals to generate a combined profile as a function of position; and
  - generating a filtered profile by applying a filter to the combined profile, wherein the filter is a low-pass filter that operates on distributions of values as a function of positions in the field of view; and
  - wherein for at least one first plurality of mutually adjacent positions in the field of view, the calibration curve is equal to a chosen profile that is selected between the combined profile and the filtered profile.

14. The method of claim 13, wherein the generating of the combined profile comprises obtaining, for each position of the predetermined path, an amplitude value derived from a corresponding reception signal of the succession of reception signals, for which the target is detected to be at the position.

15. The method of claim 13, wherein the low-pass filter is configured to damp position dependent variations of the combined profile.

16. The method of claim 13, wherein the calibration curve is defined for a set of positions in the field of view, which is composed of first positions, including the at least one first plurality of mutually adjacent positions, and second positions,
- wherein for each of the first positions, the calibration curve is equal to the chosen profile, and
- wherein for each of the second positions, the calibration curve is greater than the chosen profile.

17. The method of claim 13, wherein the comparing of the target signal amplitude with the signal amplitude base value comprises calculating at least one comparison value selected from a difference value, obtained by subtracting the signal amplitude base value from the target signal amplitude, and a ratio value, obtained by dividing the target signal amplitude by the signal amplitude base value.

18. A method of estimating a radar cross section of a target in an environment using a detection device, wherein the detection device is configured to transmit transmission signals into a field of view and to receive reception signals, the method comprising:
- generating a calibration curve that provides signal amplitude values as a function of positions in the field of view;
- detecting a reception signal, obtaining a corresponding detection profile, and analyzing the detection profile to identify the target, having a target signal amplitude and a target position corresponding thereto; and
- estimating the radar cross section of the target by comparing the target signal amplitude with a signal amplitude base value, provided by the calibration curve at the target position;
- wherein the generating of the calibration curve comprises:
  - positioning and moving a calibration target from a point of origin along a predetermined path in the environment toward or away from the detection device;
  - acquiring a succession of reception signals during the positioning and moving of the calibration target; and
  - processing and combining together the reception signals of the succession of reception signals to generate a combined profile as a function of position;
- wherein for at least one first plurality of mutually adjacent positions in the field of view, the calibration curve is equal to a chosen profile that is the combined profile,
- wherein the calibration curve is defined for a set of positions in the field of view, which is composed of first positions, including the at least one first plurality of mutually adjacent positions, and second positions,
- wherein for each of the first positions, the calibration curve is equal to the chosen profile,
- wherein for each of the second positions, the calibration curve is greater than the chosen profile, and
- wherein the generating of the calibration curve further comprises:
  - providing a curve for eliminating minimum values; and
  - comparing the curve for eliminating the minimum values with the chosen profile,
    - wherein the positions where the chosen profile is greater than the curve for eliminating the minimum values are taken as the first positions, and the positions where the chosen profile is less than the curve for eliminating the minimum values are taken as the second positions.

\* \* \* \* \*